(12) United States Patent
Agarwal

(10) Patent No.: US 8,126,784 B1
(45) Date of Patent: Feb. 28, 2012

(54) AUTOMATICALLY INITIATING PRODUCT REPLENISHMENT

(75) Inventor: Amit D. Agarwal, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 0 days.

(21) Appl. No.: 09/558,313

(22) Filed: Apr. 25, 2000

Related U.S. Application Data

(60) Provisional application No. 60/169,721, filed on Dec. 8, 1999.

(51) Int. Cl.
*G06Q 10/00* (2006.01)
(52) U.S. Cl. .......... 705/28; 705/26.1; 705/27.1; 705/22
(58) Field of Classification Search ............... 705/10, 705/22, 26, 27, 28
See application file for complete search history.

(56) References Cited

U.S. PATENT DOCUMENTS

| | | | | |
|---|---|---|---|---|
| 5,655,174 A * | 8/1997 | Hirst | ............................... | 399/27 |
| 5,909,023 A | 6/1999 | Ono | | |
| 5,983,198 A * | 11/1999 | Mowery et al. | .................. | 705/22 |
| 6,026,376 A * | 2/2000 | Kenney | ............................ | 705/27 |
| 6,141,666 A * | 10/2000 | Tobin | ............................... | 705/27 |
| 6,144,945 A * | 11/2000 | Garg et al. | ........................ | 705/28 |
| 6,182,041 B1 * | 1/2001 | Li et al. | ........................... | 704/268 |
| 6,249,774 B1 * | 6/2001 | Roden et al. | ..................... | 705/28 |
| 6,272,532 B1 * | 8/2001 | Feinleib | ......................... | 709/206 |
| 6,366,220 B1 * | 4/2002 | Elliott | .............................. | 705/22 |
| 6,405,178 B1 * | 6/2002 | Manchala et al. | ............... | 705/27 |
| 6,411,605 B1 * | 6/2002 | Vance et al. | .................... | 370/261 |
| 6,493,685 B1 * | 12/2002 | Ensel et al. | ...................... | 705/34 |

OTHER PUBLICATIONS

Amazon.com, Inc. v. BarnesAndNoble.com, Inc., 239 F.3d 1343, 57 USPQ 1747 (Fed. Cir. 2001).*

* cited by examiner

*Primary Examiner* — F. Zeender
*Assistant Examiner* — Christopher Buchanan
(74) *Attorney, Agent, or Firm* — Fenwick & West LLP

(57) ABSTRACT

A facility for automatically initiating product replenishment is described. The facility receives an indication of an order by a consumer for a first item having a first date, such as the date on which the first item was placed or fulfilled. The facility then determines a target date for replenishment based upon the identity of the first item. On the target date, the facility provides to the consumer an indication that the first item should be replenished. The indication includes a control useable by the customer to request replenishment of the first item. When this control is operated by the consumer, the facility receives an indication that the control is used by the consumer to request replenishment of the first item. In response to receiving indication the facility orders a second item to replenish the first item.

38 Claims, 4 Drawing Sheets

ACME Web Merchants

Mr. King,
According to our records, it is likely now time for
you to replenish the following item(s):

210

| quantity | description | unit price | delivery date |
|---|---|---|---|
| 1 | Pinnacle shaving gel – 12 oz can | $ 1.69 | 11/30/99 |
| 2 | Freshest 2% milk - ½ gallon carton | $ 2.10 | 11/30/99 |

211  213               212   214

Please select among the following options, first
changing the quantity or delivery date, if necessary:

| Order as above | Remind me again in a few days | No, thanks |

Replenish table 300

| target date | customer identifier | item identifier | quantity | replenishment interval |
|---|---|---|---|---|
| 11/30/99 | 15 | 110 | 1 | 48 days |
| 11/30/99 | 15 | 220 | 1 | 10 days |
| 12/1/99 | 23 | 9994 | 2 | n/a |

Item table 400

| item identifier | description | unit price |
|---|---|---|
| 110 | Pinnacle shaving get – 12 oz. can | $1.69 |
| 220 | Tabletto PDA | $395.95 |
| 9994 | Freshest 2% milk - ½ gallon | $2.10 |

Customer table 500

| customer identifier | customer name | contact information type | contact information |
|---|---|---|---|
| 15 | Mr. King | email address | king@connect.net |
| 17 | Ms. Pierce | website cookie | 17 |
| 23 | Mr. Pope | icq address | 20829745 |

501, 502, 503, 504
511, 512, 513

AUTOMATICALLY INITIATING PRODUCT REPLENISHMENT

CROSS REFERENCE TO RELATED APPLICATIONS

This application claims the benefit of provisional U.S. Patent Application No. 60/169,721, filed Dec. 8, 1999 which is hereby incorporated by reference.

TECHNICAL FIELD

The present invention is directed to the field of electronic commerce, and, more particularly, to the field of marketing processes.

BACKGROUND

Because it facilitates electronic communications between merchants and purchasers, the Internet is increasingly being used to conduct "electronic commerce." The Internet comprises a vast number of computers and computer networks that are interconnected through communication channels. Electronic commerce refers generally to commercial transactions that are at least partially conducted using the computer systems of the parties to the transactions. For example, a purchaser can use a personal computer to connect via the Internet to a merchant's computer. The purchaser can then interact with the merchant's computer to conduct the transaction.

The World Wide Web application of the Internet is an especially effective environment for electronic commerce. Many Web applications have been developed through which merchants can advertise and sell items. In particular, many such "Web merchants" sell physical items, such as books, that are delivered through conventional physical shipment channels, such as a common carrier.

While Web merchants have gained significant market share from traditional storefront merchants for many types of products, consumers have demonstrated a measure of reluctance about purchasing some types of products from Web merchants. In particular, consumable products such as food staples and personal care items have proven difficult for Web merchants to sell in significant quantities.

This is at least in part because of the way in which a consumer's need for such consumable products commonly arises. It is common for a consumer to first realize that a consumable product must be replenished when the consumer exhausts his or her supply of the consumable product. For example, a consumer may not realize that he or she needs to purchase more shaving gel until his or her current supply is exhausted. Because of the regularity with which many consumable items are used, such products often must be replenished within a very short time of their exhaustion. For example, a consumer may need to replenish exhausted shaving gel within one day. Because of the short time in which most consumable products must be replenished, Web merchants are typically unable to deliver them in time. Further, aside from delivery time issues, it seldom occurs to consumers to purchase such products from a Web merchant.

This is unfortunate, since conventional approaches to this problem leave much to be desired. In order to replenish such products, it is typical for a consumer to make a special trip to a traditional storefront merchant, thereby expending significant time, as well as substantial expense for fuel, parking, etc.

To address this issue, many purchasers go to the lengths of purchasing outlandish quantities of such products in order to reduce the frequency with which they must face the task of replenishing them. Such a strategy requires the commitment of a large amount of space in the purchaser's car and storage space in the purchaser's home, however, as well the acceleration of a significant aggregated cost.

Accordingly, a facility for automatically initiated replenishment of such products would have significant utility.

BRIEF DESCRIPTION OF THE DRAWINGS

FIG. 2 is a display diagram showing a sample replenishment suggestion provided by the facility.

FIG. 3 is a data structure diagram showing sample contents of a replenish table.

FIG. 4 is a data structure diagram showing sample contents of an item table.

FIG. 5 is a data structure diagram showing sample contents of a customer table.

DETAILED DESCRIPTION

Figure 1:
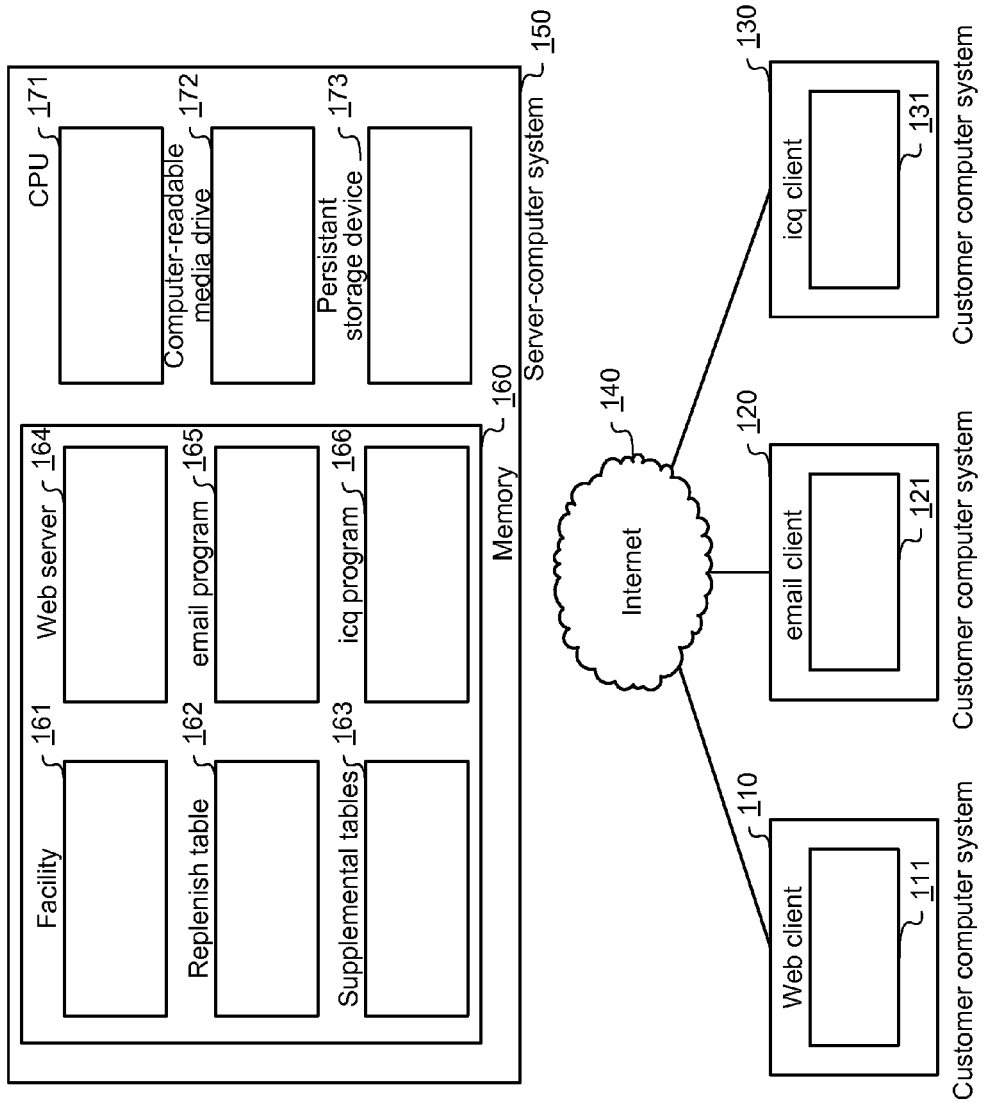
FIG. 1 is a high-level block diagram showing the environment in which the facility preferably operates.

In a preferred embodiment, an item replenishment facility ("the facility") automatically initiates the replenishment of items such as physical products. Based upon a variety of information, the facility establishes a target date on which an item presently being used by a customer should probably be replenished. In advance of the target date, using the indication, the facility provides a replenishment suggestion to the customer through one of a variety of channels. The replenishment suggestion preferably indicates which products should be replenished, and preferably includes a control for the customer to use to request the replenishment of the listed items. In response to the operation of this control by the customer, the facility places an order for the items on the customer's behalf. The order is preferably placed with a Web merchant associated with the operator of the facility, but may be alternatively placed with one of a larger list of affiliated merchants, or may be placed with a merchant identified as providing the best terms (in terms of such factors as price and delivery time) in a real-time search for merchants. In further preferred embodiments, the replenishment suggestion generated by the facility contains additional controls that enable the user to modify the order before approving it, or to defer or decline the replenishment suggestion. In a preferred embodiment, the facility initiates the replenishment of a particular item in response to an explicit "subscription request" from the user for the item. In some embodiments, the facility solicits such subscription, either at the time an order is placed for the item, when the user requests information about the item, or at another time.

By anticipating the customer's need to replenish a product, the facility provides a convenient way for customers to replenish consumable items. Because the facility does not rely upon the customer to identify the need for replenishment, the facility enables replenishment to be initiated at a time early enough to accommodate a typical delivery cycle. Further, because the facility proactively initiates contact with the customer, it overcomes the failure by many customers to realize that a Web merchant can be gainfully used to replenish the items in question. It can therefore be seen that the facility provides significant utility.

The facility preferably uses past purchases to establish replenishment target dates for particular items on behalf of particular users. For example, for products that are used up, such as shaving gel, the facility preferably establishes a target date based upon the last date on which the item was purchased, the quantity of the item then purchased, and an estimate of the rate at which the item will be depleted. The facility preferably arrives at such a rate by utilizing an average household consumption rate (one that, e.g., indicates that an average household consumes 0.25 oz. of shaving gel per day); by using information provided by the customer, such as a survey response from the customer that indicates that on an average day, two shaving sessions occur; or based on observed information about the customer and the customer's household, such as the historical frequency with which the customer has purchased the item, the historical frequency with which the customer has purchased a complement of the item (e.g., replacement shaver blades) or lifestyle information about the customer (e.g., that the customer recently purchased a beard trimmer and therefore probably has a beard and will consume less shaving gel). For items that expire at a particular time irrespective of the rate of their consumption, such as milk, the facility may use the expiration date as the target date. Also, for some purchasers, the availability of a new or improved replacement for an item that they are using creates an impetus to replace, or "replenish" the item. For example, certain purchasers will want to purchase the next version of a particular type of personal digital assistant as soon as it is available, the new album from a particular musical artist as soon as it is available, etc. Accordingly, for these customers and items, the facility preferably establishes a target date based upon the date on which the new or improved version will become available.

FIG. 1 is a high-level block diagram showing the environment in which the facility preferably operates. The diagram shows several customer computer systems, such as customer computer systems 110, 120, and 130. Each of the customer computer systems preferably has one or more programs for receiving information on a customer's behalf. For example, customer computer system 110 has a Web client computer program 111 for accessing Web pages on a Web server. Customer computer system 120 has an email client 121 for receiving email messages. Customer computer system 130 has an icq client 131 for receiving icq instant messages.

The customer computer systems are connected via the Internet 140 to a server computer system 150. The server computer system 150 contains a memory 160. The memory preferably contains the replenishment facility 161, a replenish table 162 and supplemental tables 163 for storing information used by the facility, a Web server program 164 for serving Web pages, an email program 165 for sending email messages, and an icq program 166 for sending icq instant messages. While items 161-166 are preferably stored in memory while being used, those skilled in the art will appreciate that these items, or portions of them, may be transferred between memory and a persistent storage device 173 for purposes of memory management and data integrity. The server computer system further contains one or more central processing units in (CPU) 171 for executing programs, such as programs 161, 164, 165, and 166, and a computer-readable medium drive 172, such as a CD-ROM drive, for reading information or installing programs such as the facility from computer-readable media, such as a floppy disk, a CD-ROM, or a DVD.

While preferred embodiments are described in terms of the environment described above, those skilled in the art will appreciate that the facility may be implemented in a variety of other environments, including a single, monolithic computer system, as well as various other combinations of computer systems or similar devices connected in various ways.

To more fully illustrate its implementation and operation, the facility is described in conjunction with an example. FIG. 2 is a display diagram showing a sample replenishment suggestion provided by the facility. The replenishment suggestion may preferably be sent to a customer as an email message, as an icq instant message, or as another type of message. The replenishment suggestion may further be presented to customer as a Web page, either when the customer visits a Web site for the replenishment facility, or when the customer visits another, associated Web site. The replenishment suggestion may also be provided in audio form, such as in an automatically initiated telephone call or an automatically delivered voicemail message. Those skilled in the art will appreciate that there are additional media through which the facility can also provide replenishment suggestions.

The sample replenishment suggestion 200 indicates that it is time to replenish one or more items, and includes information 210 describing the item or items that are to be replenished. The information 210 preferably includes, for each item, the quantity to be ordered, a description of the item, the item's unit price, and the delivery date for the item. To order the listed items in the listed quantities on the listed delivery dates, the customer simply clicks an "order as above" button 221. Clicking on the "order as above" button is preferably the only interaction that the user needs to perform to order the listed items in the listed quantities on the listed delivery dates. To change the quantity of one of the items, before clicking the "order as above" button, the customer replaces the suggested quantity with a new quantity. For example, to order three cartons of milk instead of the suggested quantity of two cartons of milk, the customer replaces the quantity "2" in text box 213 with the quantity "3". To change the delivery date of one of the items, before clicking the "order as above" button, the customer replaces the suggested delivery date with a new delivery date. For example, to order the shaving gel for delivery on November 20th rather than on November 30th as suggested, the customer replaces the date "11/30/99" in text box 212 with the date "11/20/99".

If the customer does not wish to place an order in response to the replenishment suggestion, the customer may decline the suggestion by clicking a "no thanks" button 223, or may defer the suggestion until later by clicking a "remind me again in a few days" button 222.

FIGS. 3-5 are data structure diagram showing data tables preferably used by the facility. FIG. 3 is a data structure diagram showing sample contents of a replenish table. The replenish table 300 is used to identify items that need replenishing, and is generated by the facility based on customer order history, other information obtained by the customer, statistical measures of item usage, information about the availability of item upgrades, and other similar information. Each row of the replenish table corresponds to a single item that will at some point need replenishing. Each row is divided into five fields, including a target date field 301 indicating the date for which replenishment should be suggested; a customer identifier field 302 identifying the customer to whom a replenishment suggestion is to be provided; an item identifier field 303 identifying the item to be replenished; a quantity field 304 indicating the quantity of the item that is to be suggested; and a replenishment interval field 305 identifying the time interval at which the specified quantity should be replenished. For example, row 311 indicates that it should be suggested to customer number 15 that one of item number 110 should be replenished on Nov. 30, 1999, and every 48 days thereafter. Because a typical replenish table may contain a very large number of rows, the facility preferably maintains an index on its target date field and/or on its customer identifier field to expedite access to the replenish table.

FIG. 4 is a data structure diagram showing sample contents of an item table. The item table 400 is used to store information about particular items. Each row of the item table corresponds to one item. Each row is divided into three fields, including an item identifier field 401 containing the item identifier for the item, a description field 402 containing a description of the item, and a unit price field 403 indicating the unit price of the item. For example, row 411 indicates that item number 110 has description "Pinnacle shaving gel—12 oz. can", and unit price $1.69.

FIG. 5 is a data structure diagram showing sample contents of a customer table. The customer table 500 is used to store information about customers. Each row of the customer table corresponds to one customer. Each row is divided into four fields, including a customer identifier field 501 containing the customer identifier for the customer; a customer name field 502 containing the customer's name; a contact information type field 503 indicating how the customer is to be contacted with replenishment suggestions; and a contact information field 504 contain an address to be used to contact the customer with replenishment suggestions. For example, row 511 indicates that the name of customer number 15 is "Mr. King," and that he is to receive replenishment suggestions via email at the email address "king@connectnet."

Figure 6:
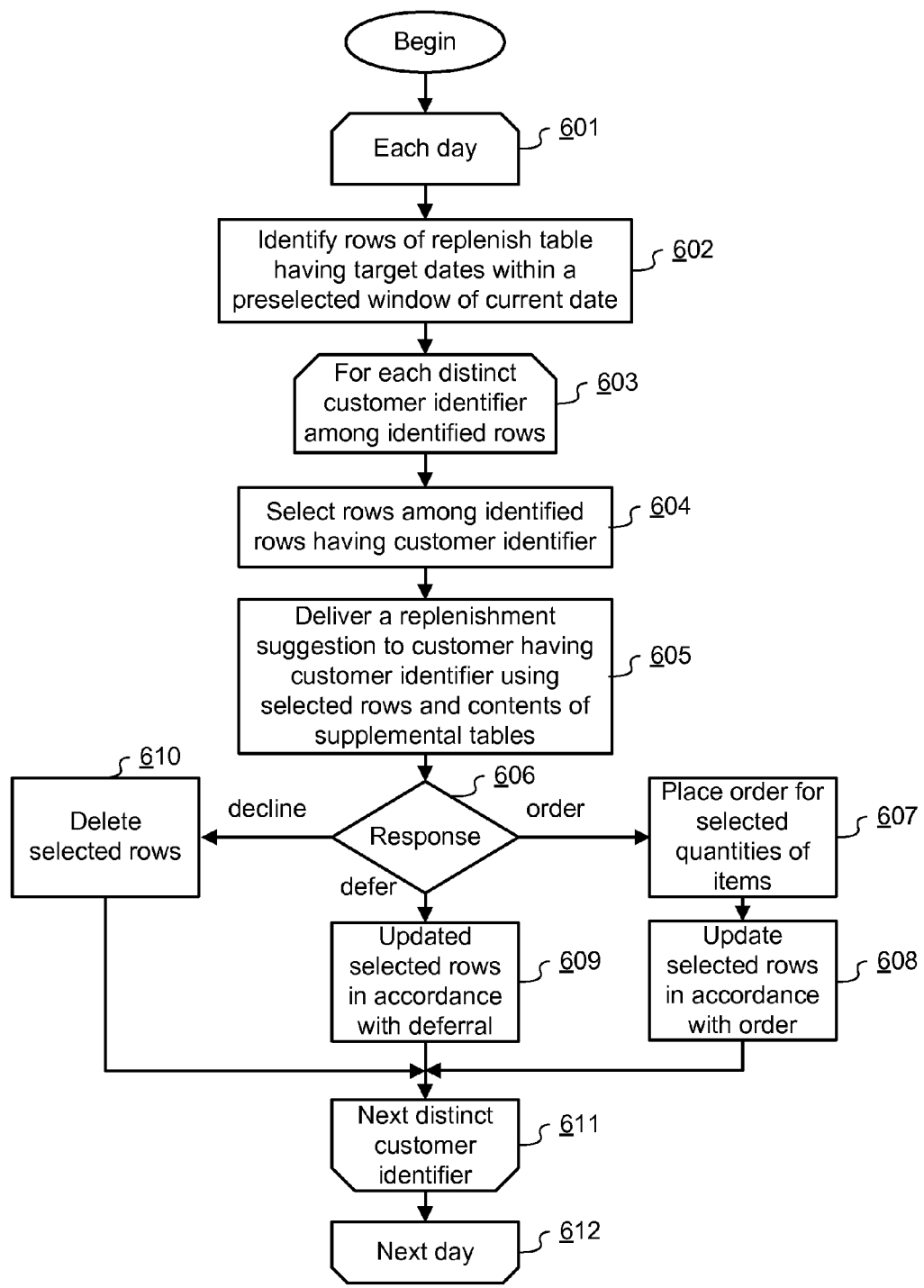
FIG. 6 is a flow diagram showing the steps preferably performed by the facility in order to present replenishment suggestions.

FIG. 6 is a flow diagram showing the steps preferably performed by the facility in order to present replenishment suggestions. Each day the facility loops once through steps 601-612. In step 602, the facility identifies any rows of the replenish table having target dates within a preselected window of the current date. As an example, the window may be selected to be about two weeks long to provide plenty of time for the items to be shipped to customers. In step 603, the facility loops through steps 604-610 once for each distinct customer identifier among the rows identified in step 602. In step 604, the facility selects rows among the identified rows having the current customer identifier. In step 605, the facility generates a replenishment suggestion using the selected rows of replenish table and the contents of supplemental tables, such as the item table and the customer table, then delivers the replenishment suggestion to the customer having the current customer identifier.

In step 606, if the customer responds to the replenishment suggestion with an order request, the facility continues in step 607. If the customer responds to the replenishment suggestion with a deferral request, the facility continues in step 609. If the customer response to the replenishment suggestion with a decline request, then the facility continues in step 610. To process an order request, in step 607, the facility places an order for the selected quantities of items to arrive on the selected delivery dates. In step 608, the facility updates the selected rows in accordance with the placed order, such as by setting a new, later target date for the ordered items for further replenishment. After step 608, the facility continues in steps 611. To process a deferral request, in step 609, the facility updates the selected rows in accordance with the deferral request, such as by setting a new, later target date for which to repeat the replenishment suggestion. After step 609, the facility continues in step 611. To process a decline request, in step 610, the facility deletes the selected rows. In step 611, the facility loops back to step 603 to process the next distinct customer identifier among the identified rows. After all of the distinct customer identifiers among the identified rows have been processed, the facility continues in step 612. The step 612, the facility loops back to step 601 to process the next day.

In an alternative preferred embodiment, the facility is implemented using an event-driven architecture. In this embodiment, the facility includes an event-raising component that raises an event each time an item is to be replenished, and an event-handling component that, for each such event, places an order for the item specified by the event, optionally first confirming the order with the client as shown in FIGS. 2 and 6. The facility's event raising component preferably raises a replenishment event when a target date is reached, or when other information indicates that replenishment should occur, such as when an indication is received that an improved replacement for a particular item is now available.

It will be understood by those skilled in the art that the above-described facility could be adapted or extended in various ways. For example, the facility is not limited to items that are tangible products. Rather, the facility may also initiate the replenishment of items that are data products, such as compilations of information or computer programs, or the replenishment of service items, or the replenishment of items of other types. Additionally, rather than providing a replenishment suggestion that must be responded to for each replenishment cycle, the facility may instead obtain the customer's preapproval for automatic replenishment, and thereafter automatically submit an order for each replenishment cycle without further approval by the customer. While the foregoing description makes reference to preferred embodiments, the scope of the invention is defined solely by the claims that follow and the elements recited therein.

I claim:

1. A method in a data processing system for automatically initiating the replenishment of a consumable product, comprising:

on a first date, fulfilling an order by a consumer for a first instance of the product;

based upon the first date, estimating, by a computer processor, a second date by which the first instance of the product will be fully consumed, wherein the second date is based at least in part upon a replenishment time interval between prior purchases, each of the prior purchases including at least one purchase of a complement of the consumable product;

before the second date, providing to the consumer an indication that the product should be replenished, the indication including a control usable by the consumer to request replenishment of the product by performing a single action;

receiving an indication that the control was used by the consumer to request replenishment of the product; and in response solely to receiving the indication, ordering a second instance of the product to replenish the first instance.

2. The method of claim 1 wherein the control is usable by the consumer to request replenishment of the first instance of the product by performing a single action of selecting the control provided in the indication.

3. The method of claim 1 wherein the second instance of the product is a physical article.

4. The method of claim 1 wherein the second instance of the product is a data product.

5. The method of claim 1 wherein the second instance of the product is a service.

6. The method of claim 1 wherein the second date is determined based on an average life span of the first instance of the product.

7. The method of claim 1 wherein the second date is determined based on an expiration date for the first instance of the product.

8. The method of claim 1 wherein the second date is determined based on an availability date for the second instance of the product.

9. The method of claim 1 wherein the second date is determined based on a length of intervals between prior purchases of the product.

10. The method of claim 1 wherein the consumer has made a plurality of prior purchases of a complement of the product, and wherein the second date is determined based on a length of intervals between the plurality of prior purchases of the complement of the product.

11. The method of claim 1 wherein a second date is determined based on the size of the first instance of the product.

12. The method of claim 1 wherein the second date is determined based on information provided by the consumer.

13. The method of claim 1 wherein a second date is determined based on information about the consumer's lifestyle.

14. The method of claim 1 wherein the consumer has made a plurality of prior purchases of the consumable product, and wherein the second date is determined based on a length of intervals between the plurality of prior purchases of the consumable product.

15. The method of claim 1 wherein a second consumer has made a plurality of prior purchases of the consumable product, and wherein the second date is determined based on a length of intervals between the plurality of prior purchases of the consumable product made by the second consumer.

16. The method of claim 1 wherein the second date is determined based on prior purchases by the consumer of a plurality of complements of the first item.

17. The method of claim 1 wherein the second date is determined based on a historical frequency with which the consumer has purchased a complement of the consumable product.

18. The method of claim 1 wherein the indication that the product should be replenished is transmitted to the consumer at a time at which the consumer is not engaged in an electronic shopping activity.

19. The method of claim 1 wherein the steps of estimating the target date, providing the indication, and ordering the second item all occur without intervention of the consumer other than the use of the control by the consumer to request replenishment.

20. A method in a data processing system for ordering an item, comprising:
   on a first date, receiving an order by a consumer for a first item;
   determining, by a computer processor, a target date for suggesting replenishment of the first item, the target date based at least upon the first date, the identity of the first item, and a replenishment time interval between prior purchases, each of the prior purchases including at least one purchase of a complement of the first item;
   on the target date, providing to the consumer an indication that the first item should be replenished, the indication including a user interface control usable by the consumer to request replenishment of the first item;
   receiving an indication that the control was used by the consumer to request replenishment of the first item; and
   in response solely to receiving the indication, ordering a second item to replenish the first item.

21. The method of claim 20 wherein the control is usable by the consumer to request replenishment of the first item by performing a single action.

22. The method of claim 20 wherein the second item is a physical article.

23. The method of claim 20 wherein the second item is a data product.

24. The method of claim 20 wherein the second item is a service.

25. The method of claim 20 wherein the target date is determined based on an average life span of the first item.

26. The method of claim 20 wherein the target date is determined based on an expiration date for the first item.

27. The method of claim 20 wherein the target date is determined based on an availability date for the second item.

28. The method of claim 20 wherein the target date is determined based on a length of intervals between prior purchases of the first item.

29. The method of claim 20 wherein the consumer has made a plurality of prior purchases of a complement of the first item, and wherein the target date is determined based on a length of intervals between the plurality of prior purchases of the complement of the first item.

30. The method of claim 20 wherein a target date is determined based on the size of the first item.

31. The method of claim 20 wherein the target date is determined based on information provided by the consumer.

32. The method of claim 20 wherein a target date is determined based on information about the consumer's lifestyle.

33. The method of claim 20 wherein the consumer has made a plurality of prior purchases of the first item, and wherein the target date is determined based on a length of intervals between the plurality of prior purchases of the first item.

34. The method of claim 20 wherein a second consumer has made a plurality of prior purchases of the first item, and wherein the target date is determined based on a length of intervals between the plurality of prior purchases of the first item made by the second consumer.

35. The method of claim 20 wherein the target date is determined based on prior purchases by the consumer of a plurality of complements of the first item.

36. The method of claim 20 wherein the target date is determined based on a historical frequency with which the consumer has purchased a complement of the first item.

37. The method of claim 20 wherein the indication that the product should be replenished is transmitted to the consumer at a time at which the consumer is not engaged in an electronic shopping activity.

38. The method of claim 20 wherein the steps of estimating the target date, providing the indication, and ordering the second item all occur without intervention of the consumer other than the use of the control by the consumer to request replenishment.

* * * * *